(12) United States Patent
Lam et al.

(10) Patent No.: US 10,926,811 B2
(45) Date of Patent: Feb. 23, 2021

(54) REINFORCEMENT MEMBER COMPRISING A COLD BENT TAB

(71) Applicant: ArcelorMittal, Luxembourg (LU)

(72) Inventors: Jimmy Lam, Noisy le Grand (FR); Joël Wilsius, Paris (FR); Nicolas Schneider, Saint-Martin Longueau (FR)

(73) Assignee: ARCELORMITTAL, Luxembourg (LU)

( * ) Notice: Subject to any disclaimer, the term of this patent is extended or adjusted under 35 U.S.C. 154(b) by 99 days.

(21) Appl. No.: 16/346,467

(22) PCT Filed: Nov. 21, 2017

(86) PCT No.: PCT/IB2017/057296
§ 371 (c)(1),
(2) Date: Apr. 30, 2019

(87) PCT Pub. No.: WO2018/092113
PCT Pub. Date: May 24, 2018

(65) Prior Publication Data
US 2019/0276095 A1    Sep. 12, 2019

(30) Foreign Application Priority Data

Nov. 21, 2016 (WO) .................. PCT/IB2016/057002

(51) Int. Cl.
*B62D 29/00* (2006.01)
*B21D 22/02* (2006.01)
(Continued)

(52) U.S. Cl.
CPC ......... *B62D 29/007* (2013.01); *B21D 22/022* (2013.01); *B32B 15/012* (2013.01);
(Continued)

(58) Field of Classification Search
CPC .......................... B62D 33/0617; B62D 33/06; B62D 33/0604; B62D 33/0633; B62D 25/02;
(Continued)

(56) References Cited

U.S. PATENT DOCUMENTS 7,823,964 B2 * 11/2010 Tasumi ................ B62D 21/157
296/204
8,960,776 B2 * 2/2015 Boettcher .............. B62D 25/20
296/193.07
(Continued)

FOREIGN PATENT DOCUMENTS

| DE | 102005055374 A1 | 5/2007 |
| DE | 102013010024 A1 | 12/2014 |
| EP | 2279931 A1 | 2/2011 |

OTHER PUBLICATIONS

The International Search Report issued in connection with International application No. PCT/IB2016/057002 dated Jul. 26, 2017.
(Continued)

*Primary Examiner* — D Glenn Dayoan
*Assistant Examiner* — Sunsurraye Westbrook
(74) *Attorney, Agent, or Firm* — Davidson, Davidson & Kappel, LLC

(57) ABSTRACT

The reinforcement member includes a body made of a press hardened steel having a tensile strength greater or equal to 1200 MPa. The body is coated with a zinc-based coating or with an aluminum-based coating and extends along a main direction. The reinforcement member also includes at least one tab extending from the body along a transversal direction forming a non-zero angle with the main direction. The bend between the body and the tab defines an intrados and an extrados. The tab is made of a cold bent part of the body, and the elongation of the extrados is between 10% and 25%.

21 Claims, 5 Drawing Sheets

(51) Int. Cl.
*B32B 15/01* (2006.01)
*B62D 25/06* (2006.01)
*B62D 25/20* (2006.01)
*B62D 27/02* (2006.01)
*B62D 33/06* (2006.01)
*B62D 65/02* (2006.01)
*C22C 38/00* (2006.01)
*C22C 38/02* (2006.01)
*C22C 38/04* (2006.01)
*C22C 38/06* (2006.01)
*C22C 38/48* (2006.01)
*C22C 38/50* (2006.01)
*C22C 38/54* (2006.01)

(52) U.S. Cl.
CPC ............. *B62D 25/06* (2013.01); *B62D 25/20* (2013.01); *B62D 27/02* (2013.01); *B62D 33/06* (2013.01); *B62D 65/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/48* (2013.01); *C22C 38/50* (2013.01); *C22C 38/54* (2013.01); *B32B 2605/00* (2013.01)

(58) Field of Classification Search
CPC ... B62D 25/06; B62D 25/145; B62D 33/0625
USPC .......... 296/190.08, 3, 64, 96.15, 210, 26.09, 296/190.03, 190.11, 102; 29/897.2, 428, 29/401.1, 434
See application file for complete search history.

(56) References Cited

U.S. PATENT DOCUMENTS

| | | | |
|---|---|---|---|
| 9,186,957 B2* | 11/2015 | Yoshida | B60H 1/00271 |
| 10,343,554 B2* | 7/2019 | Maier | B62D 21/03 |
| 2002/0167200 A1 | 11/2002 | Uchida | |
| 2015/0003898 A1* | 1/2015 | Shiozaki | B23K 9/00 403/267 |
| 2017/0106906 A1* | 4/2017 | Onishi | B62D 25/2036 |

OTHER PUBLICATIONS

The International Search Report issued in connection with International application No. PCT/IB2017/057296 dated Jan. 26, 2018.

* cited by examiner

REINFORCEMENT MEMBER COMPRISING A COLD BENT TAB

The present invention relates to a reinforcement member for a vehicle of the type comprising a body made of a press hardened steel having a tensile strength greater or equal to 1200 MPa coated with a zinc-based coating or with an aluminum-based coating, said body extending along a main direction, the reinforcement member further comprising at least one tab extending from the body along a transversal direction forming a non-zero angle with the main direction, the bend between the body and the tab defining an intrados and an extrados.

The invention also relates to a roof reinforcement assembly comprising such a reinforcement member, to a seat crossmember assembly comprising such a reinforcement member, to a method for producing such a reinforcement member, such a roof reinforcement assembly and such a seat crossmember assembly.

BACKGROUND OF THE INVENTION

Reinforcement members made of a high strength steel such as a press hardened steel having a tensile strength greater or equal to 1200 MPa and coated with a zinc-based coating or with an aluminum-based coating are particularly satisfactory to reinforce vehicle parts that must not be deformed in case of an impact against the vehicle. Such reinforcement members are substantially undeformable in case of an impact and can therefore prevent the deformation of the part of the vehicle to which the reinforcement member is attached, for example a seat of the vehicle or a floor panel, etc.

The reinforcement member is attached to its surrounding, for example by welding a part of the reinforcement member to a surrounding part. In some cases, the reinforcement member is attached to a part that does not extend in the same direction as the reinforcement member. In this case, joining the reinforcement member to the surrounding part may require an additional attachment part comprising a tab extending in the direction of the reinforcement member and attached to this member and another tab extending in the direction of the surrounding part and attached to this part. Such a solution requires many attachment operations and can be problematic in terms of mechanical properties of the attachment. If the attachment is not strong enough, it may break in case of an impact, which would render the reinforcement member useless to prevent deformation of the reinforced vehicle part. Consequently, it is preferable to attach the reinforcement member directly to the surrounding part. In this case, a tab can be bent from the reinforcement member such that the tab extends in the direction of the surrounding part, the tab being attached to the surrounding part. However, the bending operation can lead to a fracture of the reinforcement member, or at least can deteriorate the quality of the tab by producing cracks in the coating. These cracks are susceptible to be propagated to the high strength steel, which can lead to a fracture of the tab in case of an impact. Furthermore, these cracks also reduce the resistance to corrosion of the reinforcement member, which therefore has a reduced lifetime. This problem of fracture and/or cracking occurs with press hardened steels in particular with high bending radii of the tab and/or with increased thicknesses of the reinforcement member.

BRIEF SUMMARY OF THE INVENTION

An object of the present invention is to overcome these drawbacks and provide a reinforcement member adapted to be attached in a reliable manner to a surrounding part of a vehicle.

To this end, the invention provides a reinforcement member of the afore-mentioned type, wherein said tab is made of a cold bent part of the body, the elongation of the extrados being comprised between 10% and 25%.

Cold bending a tab from the body such that the elongation of the extrados is substantially comprised between 10% and 25% allows bending the tab at an important angle without causing the fracture of the reinforcement member and/or damaging the coating of the tab and hence the high strength steel even with a reinforcement member having an important thickness.

In certain embodiments, the reinforcement member for a vehicle comprises a body made of a press hardened steel having a tensile strength greater or equal to 1200 MPa coated with a zinc-based coating or with an aluminum-based coating, said body extending along a main direction, the reinforcement member further comprising at least one tab extending from the body along a transversal direction forming a non-zero angle ($\alpha$) with the main direction, the bend between the body and the tab defining an intrados and an extrados, wherein said tab is made of a cold bent part of the body, the elongation of the extrados comprising between 10% and 25%.

In some embodiments, the angle ($\alpha$) between the main direction and the transversal direction is substantially comprised between 45° and 100° or between 85° and 95°.

In some embodiments, the curvature radius of the bend between the body and the tab is substantially comprised between 3 mm and 7 mm.

In some embodiments, the press hardened steel comprises in % weight:

$0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration; or $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration; or $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, %, the remainder being iron and unavoidable impurities resulting from the elaboration.

In some embodiments, the body has substantially a U-shaped cross-section and comprises an inner face extending on the interior of the U-shaped cross-section and an outer face extending on the exterior of the U-shaped cross-section, the intrados extending on the outer face and the extrados extending on the inner face.

In some embodiments, the body has substantially a U-shaped cross-section and comprises an inner face extending on the interior of the U-shaped cross-section and an outer face extending on the exterior of the U-shaped cross-section, the intrados extending on the inner face and the extrados extending on the outer face.

The invention also provides a roof reinforcement assembly for a heavy goods vehicle, comprising a roof reinforcement structure for receiving a roof panel of the heavy goods vehicle, said roof reinforcement structure extending substantially along a roof plane, and a compartment reinforcement structure substantially parallel to the roof reinforcement structure, wherein the roof reinforcement structure is connected to the compartment reinforcement structure by at least one reinforcement member as described above, said reinforcement member extending from the roof reinforcement structure to the compartment reinforcement structure along a direction forming a non-zero angle with the roof plane.

The reinforcement member described above is particularly suited to be used in a roof reinforcement assembly of a heavy goods vehicle to guarantee a proper protection of the vehicle compartment in case of an impact against the roof of the vehicle, for example in case of a barrel roll. In case of a barrel roll, an important force is first applied against the reinforcement member according to a direction substantially perpendicular to the main direction and then an important force is applied against the top of the roof reinforcement assembly in the direction of the main direction when the vehicle compartment is turned upside down. Thanks to the reinforcement member according to the invention, the first force applied does not deform the reinforcement member which can then fulfill its function with the roof reinforcement structure of preventing a crush of the vehicle compartment when the second force is applied.

In certain embodiments, the roof reinforcement assembly for a heavy goods vehicle comprises a roof reinforcement structure for receiving a roof panel of the heavy goods vehicle, said roof reinforcement structure extending substantially along a roof plane, and a compartment reinforcement structure substantially parallel to the roof reinforcement structure, wherein the roof reinforcement structure is connected to the compartment reinforcement structure by at least one reinforcement member as described above, said reinforcement member extending from the roof reinforcement structure to the compartment reinforcement structure along a direction forming a non-zero angle with the roof plane.

In some embodiments, the reinforcement member extends substantially perpendicularly to the roof plane.

In some embodiments, the tab of the reinforcement member is welded to the compartment reinforcement structure.

In some embodiments, the roof reinforcement assembly comprises a plurality of reinforcement members connecting the roof reinforcement structure to the compartment reinforcement structure.

In some embodiments, the roof reinforcement structure comprises two longitudinal members parallel to each other and extending substantially along a longitudinal direction between a front end and a rear end and two transversal members parallel to each other and substantially perpendicular to the longitudinal members between two lateral ends, the roof reinforcement assembly comprising two front reinforcement members extending from the front ends of the longitudinal members and four lateral reinforcement members extending from the lateral ends of the transversal members.

In some embodiments, the roof reinforcement assembly further comprises a front member extending between and attached to the front reinforcement members.

In some embodiments, the roof reinforcement assembly the compartment reinforcing structure comprises a front transversal member substantially parallel to the transversal members of the roof reinforcement structure, and two lateral longitudinal members substantially parallel to the longitudinal members of the roof reinforcement structure, the front reinforcement members being attached to the front transversal member, two of the lateral reinforcement members being attached to one of the lateral longitudinal member and the other two of the lateral reinforcement members being attached to the other lateral longitudinal member.

The invention also provides a seat crossmember assembly for an automotive vehicle, comprising at least one floor reinforcement structure arranged for receiving at least one seat of the automotive vehicle, the seat is attached to the floor reinforcement structure via at least one reinforcement member as described above, said reinforcement member being attached to said floor reinforcement structure.

The reinforcement member described above is particularly suited to be used in a seat crossmember assembly of an automotive vehicle to guarantee a proper protection of the occupants seated in the seat attached above the reinforcement member by preventing a deformation of the seat in case of an impact against the floor structure.

In some embodiments, the floor reinforcement structure comprises at least one side rail extending along a longitudinal direction and at least one central tunnel substantially parallel to the side rail, the reinforcement member extending along a transversal direction between the side rail and the central tunnel and being attached to said side rails and/or to said central tunnel by at least one tab of the reinforcement member.

In some embodiments, the floor reinforcement structure comprises two side rails extending on either side of the central rail, the central rail being connected to one of the side rails by at least one reinforcement member and to the other side rail by at least one another reinforcement member.

The invention also provides to a method for producing a reinforcement member as described above, the method comprising the steps of:
providing a blank pre-coated with a zinc-based pre-coating or with an aluminum-based pre-coating,
hot press forming the blank into the shape of the body to obtain a body made of a press hardened steel having a tensile strength greater or equal to 1200 MPa, bending a tab from the body when the body is cooled down such that the elongation of the extrados of the bend between the body and the tab is substantially comprised between 10% and 25%.

In some embodiments, the hot press forming step occurs at a temperature substantially comprised between 750° C. and 950° C., and wherein the cold bending step occurs at a temperature substantially comprised between 10° C. and 40° C.

The invention also provides to a method for producing a roof reinforcement assembly as described above, comprising the steps of:
providing a roof reinforcement structure and a compartment reinforcement structure, attaching the roof reinforcement structure to the compartment reinforcement structure by at least one reinforcement member by welding at least one tab of the reinforcement member to the roof reinforcement structure and/or to the compartment reinforcement structure.

The invention also provides a method for producing a seat crossmember assembly as described above, comprising the steps of:
providing a floor reinforcement structure,
attaching at least one reinforcement member to the floor reinforcement structure by welding at least one tab of the reinforcement member to said floor reinforcement structure.

BRIEF DESCRIPTION OF THE DRAWINGS

Other aspects and advantages of the invention will be understood upon reading the following description, given by way of example and made in reference with the appended drawings, in which.

DETAILED DESCRIPTION OF THE INVENTION

In the following description, the terms "rear" and "front" are defined according the usual directions of a mounted vehicle. The term "longitudinal" is defined according to the rear-front direction of the vehicle.

Figure 1:
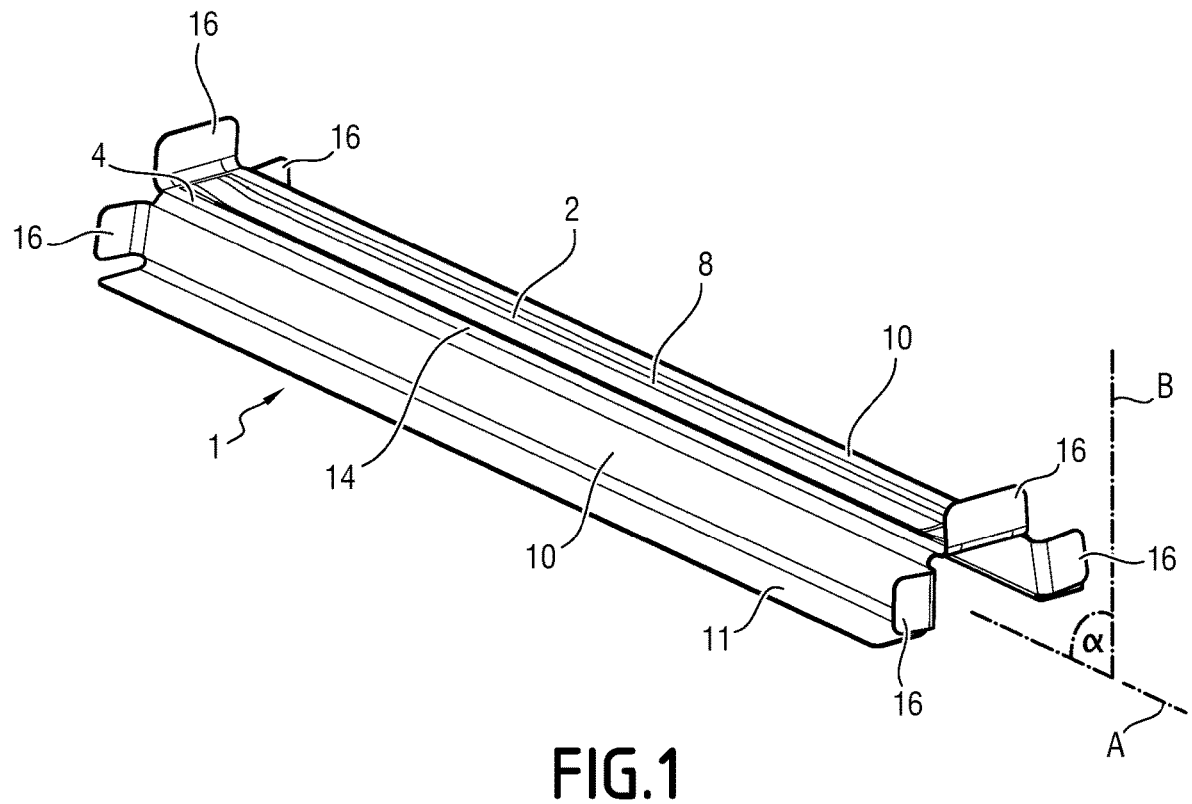
FIG. 1 is a perspective view of a reinforcement member according to the invention.
Figure 2:
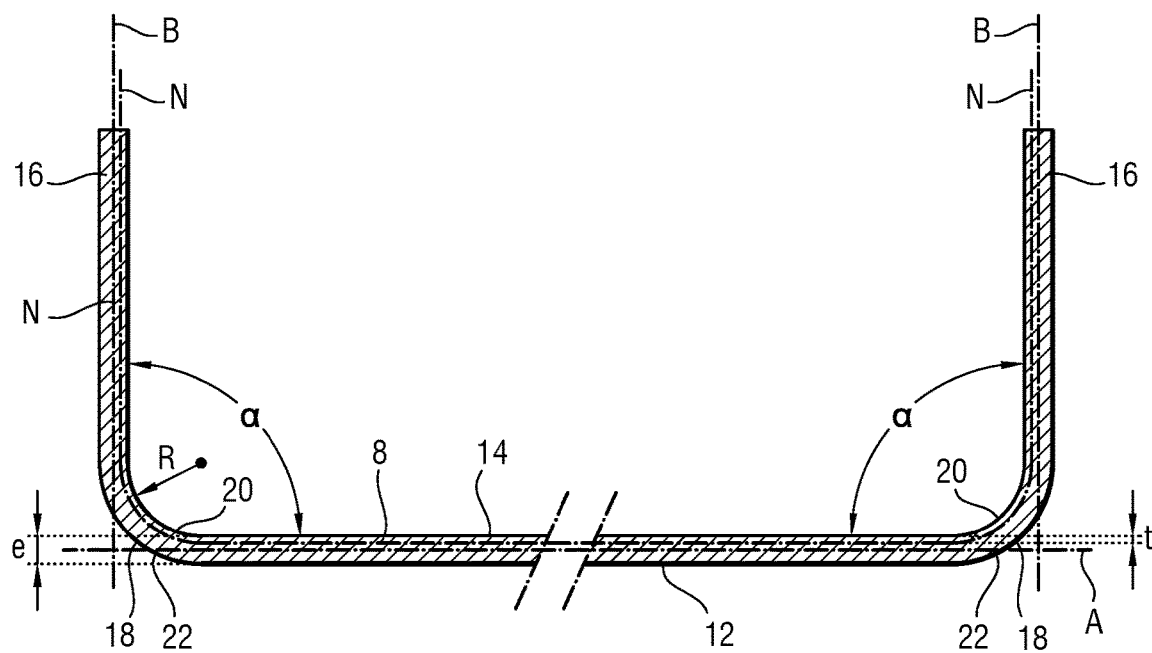
FIG. 2 is a cross-sectional view along the main axis A of the reinforcement member of FIG. 1.

In reference to FIGS. 1 and 2, a reinforcement member 1 for a vehicle is described. Such a reinforcement member 1 can be used to reinforce a part of a vehicle to prevent deformation of said vehicle part. For example, the reinforcement member 1 can be used as a seat crossmember, extending under the seat of the vehicle or as a part of a roof reinforcement assembly, as will be described subsequently.

The reinforcement member 1 comprises a body 2 made of a press hardened steel having a tensile strength greater or equal to 1200 MPa coated with a zinc-based coating or with an aluminum-based coating.

The composition of such steel may comprise for example, in % weight: $0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration.

According to an additional embodiment, the steel composition may comprise, for example, in % weight: $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration. With this composition range, the tensile strength of the press hardened part is comprised between 1300 and 1650 MPa.

According to an additional embodiment, the steel composition may comprise, for example, in % weight: $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, the remainder being iron and unavoidable impurities resulting from the elaboration. With this composition range, the tensile strength of the press hardened part is higher than 1800 MPa.

The microstructure of such a steel comprises a large volume fraction of martensite, for example higher than 80%, or even 90%. Such a steel has very high mechanical characteristics, which makes it suitable for forming a reinforcement member intended to remain undeformed in case of an important load applied against the reinforcement member.

In one embodiment, the coating is obtained from a pre-coating. The pre-coating before hot press forming may be, for example, a zinc-based pre-coating (i.e. wherein zinc is the main constituent of the pre-coating), or aluminum-based pre-coating (i.e. wherein aluminum is the main constituent of the pre-coating). Such a pre-coating is applied to the body 2 of the reinforcement member before the body 2 is hot press formed to form the reinforcement member, as will be described subsequently. During the heating step previous to the press forming step, the pre-coating is transformed into a coating. The pre-coating before hot press forming may, comprise, for example, aluminum, silicon (between 7% and 11%) and iron (between 2% and 3%) or zinc, aluminum (around 3.7%) and magnesium (around 3%). After hot press forming, the coating may comprise intermetallic compounds. Such intermetallic compounds are known as being generally not easily deformable at room temperature. In a surprising manner, the inventors have discovered that cold bending of coatings having intermetallic compounds is possible in the conditions that will be described subsequently.

The reinforcement member is a one piece part, i.e. an integral part made of from a single blank, as will be described subsequently.

The body 2 extends along a main direction A between a first end 4 and a second end 6. The body 2 has a U-shaped cross-section in a plane perpendicular to the main axis A. Consequently, the body 2 comprises a bottom 8 and two branches 10 extending substantially perpendicularly to and on either sides of the bottom 8. At the end of each branch 10, opposite the bottom 8, the body 2 for example comprises a fixing flange 11 extending substantially perpendicularly to the branch 10 and parallel to the bottom 8 towards the exterior of the body 2. The cross-section of the body 2 may be different, for example an "omega" cross-section or any other suitable cross-section.

The body 2 comprises an inner face 12, defined by the interior of the U-shape, i.e. the face facing the space defined between the bottom 8 and the branches 10, and an outer face 14, defined by the exterior of the U-shape, i.e. the face opposite the inner face 12.

The wall thickness e of the body 2 is defined as the distance between the inner face 12 and the outer face 14. In a same plane perpendicular to the main axis A, the wall thickness of the bottom 8 is equal to the wall thickness of the branches 10, while said thickness can vary along the longitudinal axis A between the first end 4 and the second end 6. According to an embodiment, the wall thickness e of the body 2 is substantially comprised between 0.6 mm and 3 mm.

At least one tab 16 extends from the bottom 8 and/or from the branches 10 at the first end 4 and/or the second end 6 of the body. As will be described subsequently, the tab 16 is obtained by cold bending an end part of the hot press formed body 2, meaning that the tab 16 is integral with the body 2.

The tab 16 extends along a transversal axis B forming a non-zero angle α with the main axis A. According to an embodiment, angle α is substantially comprised between 45° and 100°, for example comprised between 85° and 95°, for example equal to 90°. The value of angle α depends on the direction of the part to which the reinforcement member 1 is to be attached, as will be described subsequently. Such an angle corresponds to a curvature radius R of the bend 18 comprised between 3 mm and 7 mm.

The bend 18 between the body 2 and the tab 16 defines an intrados 20 and an extrados 22, as more clearly visible in FIG. 2. The bend 18 is defined as the arcuate portion extending between the body 2 and the tab 16. The intrados 20 is defined as the internal surface of the bend 18, i.e. the surface facing the concavity of the bend 18. The extrados 22 is defined as the external surface of the bend 18, i.e. the surface opposite the intrados 20. According to the embodiment shown in the figures, the tab 16 is such that the intrados 20 extends on the outer face 14 of the body 2 and the extrados 22 extends on the inner face 12 of the body 2 such that the tab 16 extends towards the exterior of the reinforcement member 1. Alternatively, the tab 16 could be such that the intrados 20 extends on the inner face 12 of the body 2 and the extrados 22 extends on the outer face 14 of the body 2, such that the tab 16 extends towards the interior of the reinforcement member 1.

During the bending of the tab 16, the extrados 22 is subjected to an elongation while the intrados 20 is subjected to a compression. The bend 18 is such that the extrados 22 is subjected to an elongation substantially comprised between 10% and 25%. The elongation is defined as the variation of the length of the extrados 22 along the main axis A due to the bending of the tab 16. The value of the elongation of the extrados due to the bending depends on the curvature radius R of the bend 18, on the wall thickness e of the body 2 and on the position of the "neutral axis" N of the body 2 between the intrados 20 and the extrados 22. The neutral axis N, shown in FIG. 2, is defined as the axis along which the body 2 is neither elongated nor compressed during the bending of the tab 16. The distance between the intrados 20 and the neutral axis N is designated by t in FIG. 2.

The elongation of the extrados 22 is defined by the following formula:

$$E = \frac{R+e}{R+k*e},$$

wherein E is the elongation of the extrados, R is the curvature radius of the bend 18, e is the wall thickness of the body 2 and k is a factor defining the position of the neutral axis N between the intrados 20 and the extrados 22. The k factor is equal to $$\frac{t}{e},$$

i.e. to the ratio between the distance t between the intrados 20 and the neutral axis N and the thickness e to the body 2. The k factor is for example comprised between 0.45 and 0.5, meaning that the neutral axis N is generally closer to the intrados 20 than to the extrados 22 or substantially at equal distance between the intrados 20 and the extrados 22. The elongation of the material of the extrados 22 is for example comprised between 10% and 25% relative to the body 2. More particularly, the elongation is for example comprised between 22% and 25%

The following tables show that the bending of the tab 16 does not produce any cracks or does not break the reinforcement member 1 in the above ranged when the bending is a cold bending operation. The following tables are obtained for a reinforcement member 1 made of a steel having a tensile strength substantially equal to 1500 MPa, for different body thicknesses e, for a k factor equal to 0.45 and for different pre-coatings.

| Pre-coating | Precoating: Aluminum, Silicon (9%) and Iron (3%) 25 μm thick on each side of the body | | | |
|---|---|---|---|---|
| Body thickness (mm) | 1.5 | | | |
| Radius of curvature at the intrados (mm) | 2 | 3 | 5 | 6 |
| Elongation of the extrados | 30.8% | 22.4% | 14.5% | 12.4% |
| Results: | fracture | OK | OK | OK |

| Pre-coating | Precoating: Aluminum, Silicon (9%) and Iron (3%) 25 μm thick on each side of the body | | |
|---|---|---|---|
| Body thickness (mm) | 2 | | |
| Radius of curvature at the intrados (mm) | 3 | 5 | 6 |
| Elongation of the extrados | 28.2% | 18.6% | 15.9% |
| Results: | fracture | OK | OK |

| Pre-Coating | Precoating: Zinc and Iron (10%) 10 μm thick on each side of the body | | | |
|---|---|---|---|---|
| Body thickness (mm) | 1.5 | | | |
| Radius of curvature at the intrados (mm) | 2 | 3 | 5 | 6 |
| Elongation of the extrados | 30.8% | 22.4% | 14.5% | 12.4% |
| Results: | fracture | OK | OK | OK |

As can be seen from these tables, the range of acceptable elongation for the extrados of the bend 18 is between 10% and 25%. When the elongation is higher than 25%, damage and fracture occur. When the elongation is lower than 10%, the radius of curvature is too high which renders the tab unfit for attachment to a surrounding part.

The length of the tab 16 measured along the transversal axis B is arranged such that the tab 16 can form a welding surface to attach the reinforcement member to a surrounding part. The tab 16 can be attached to a portion of the surrounding part that also extends along the transversal axis B, meaning that the tab 16 can be applied against this portion which extends in the same direction and can be welded thereto. The tab 16 therefore allows attaching the reinforcement member 1 to a surrounding part extending along a transversal direction B by welding the tab 16 to the surrounding part without requiring an additional part joining the reinforcement member 1 to the surrounding part.

According to the embodiment shown in FIG. 1, tabs 16 are provided at both ends 4 and 6 of the reinforcement member 1 such that the reinforcement member 1 can be attached to two surrounding parts extending on either side of the reinforcement member 1. Furthermore, each end comprises several tabs 16, for example one extending from the bottom 8 and one extending from each branch 10. In this case, the tabs 16 extending from the branches 10 extend along a transversal axis which is substantially perpendicular to the transversal axis along which the tab 16 extending from the bottom 8 extends. It should be understood that tabs could be provided at one end of the reinforcement member 1 and that more than one tab could be provided on the bottom and/or on the branches depending on the attachment requirements of the reinforcement member 1.

The method for producing the reinforcement member described above will now be described.

A planar blank having the wall thickness e of the body 2 and made of the material of the body is first coated with a pre-coating as described above.

The planar blank is then hot pressed formed (which is equivalent to press-hardened) into the body 2. The blank is cut in order to comprise one or more extensions intended to form the tab(s) 16 after bending as will be described below.

The hot press forming operation is carried out at a temperature substantially comprised between 750° C. and 950° C. During this operation, the blank is shaped to acquire its three-dimensional shape by a single operation of a press tool. However, the tab 16 is not realized during the hot press forming operation, meaning that the extensions are not shaped during the hot press forming step. As explained previously, the hot press forming operation causes the pre-coating to transform into a coating having intermetallic compounds, due to the diffusion of substrate elements of the body 2 into the pre-coating.

Once a coated body 2 is obtained, the body 2 is cooled down, for example to a temperature substantially comprised between 10° C. and 40° C. For example, the body 2 is cooled down to the ambient temperature.

Once the body 2 is cooled down, each extension is bent to form the tab(s). Each tab 16 is bent to be as described previously, i.e. with an extrados 22 of the bend 18 subjected to an elongation substantially comprised between 10% and 25%.

Since the body is cooled down when the bending occurs, the further bending step is a cold bending step. Such a cold bending step allows obtaining the tab(s) without causing fracture of the reinforcement member and/or damaging the coating and hence the steel of the body 2 by forming cracks in the bend between the body 2 and the tabs 16. More particularly, the extrados 22 is preserved and not damaged during the cold bending operation, even with important angles α (for example around 90°) and small curvature radiuses (for example around 5 mm). Consequently, the mechanical properties of the reinforcement member 1 are preserved even in the area of the bends 18 between the tabs 16 and the body 2. Furthermore, since the coating is not damaged, the resistance to corrosion of the reinforcement member is preserved and the lifetime of the reinforcement member is not impaired. The reinforcement member 1 according to the invention is therefore suitable to be directly attached to a surrounding part without adding an additional attachment part and without risking a failure of the attachment between the tab 16 and the surrounding part in case of an important load applied on the reinforcement member 1.

Figure 3:
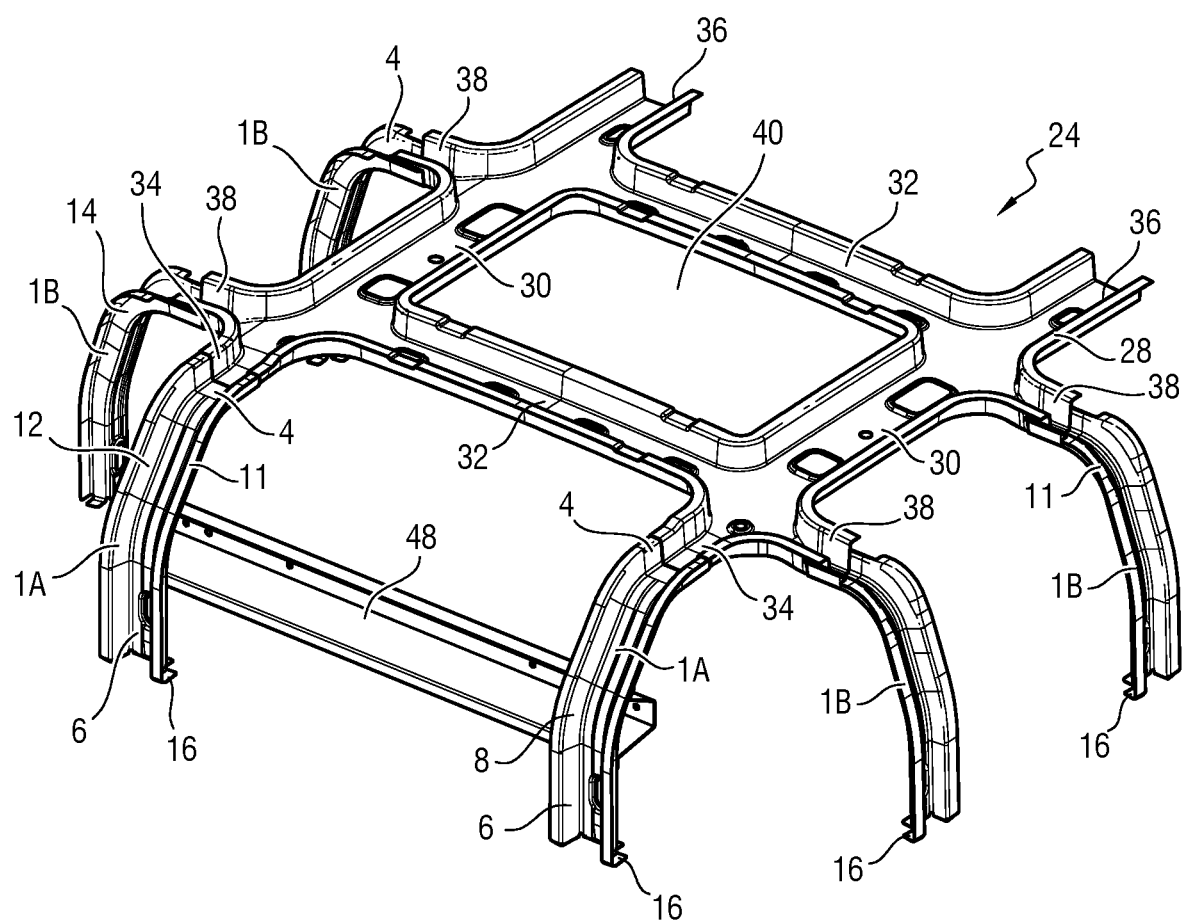
FIG. 3 is a perspective view of part of a roof reinforcement assembly according to the invention.
Figure 4:
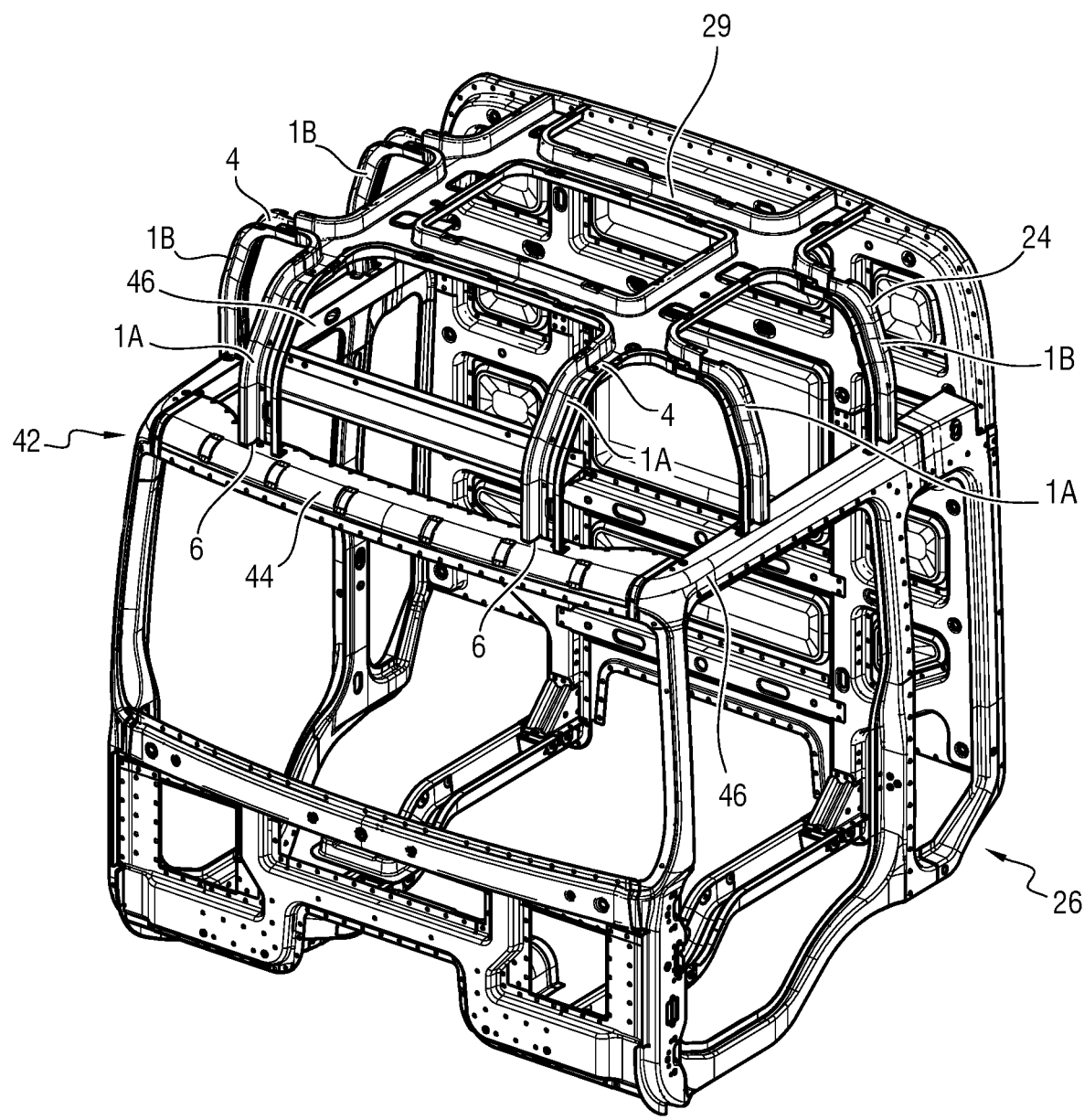
FIG. 4 is perspective view of a heavy goods vehicle compartment comprising a roof reinforcement assembly according to the invention.
Figure 5:
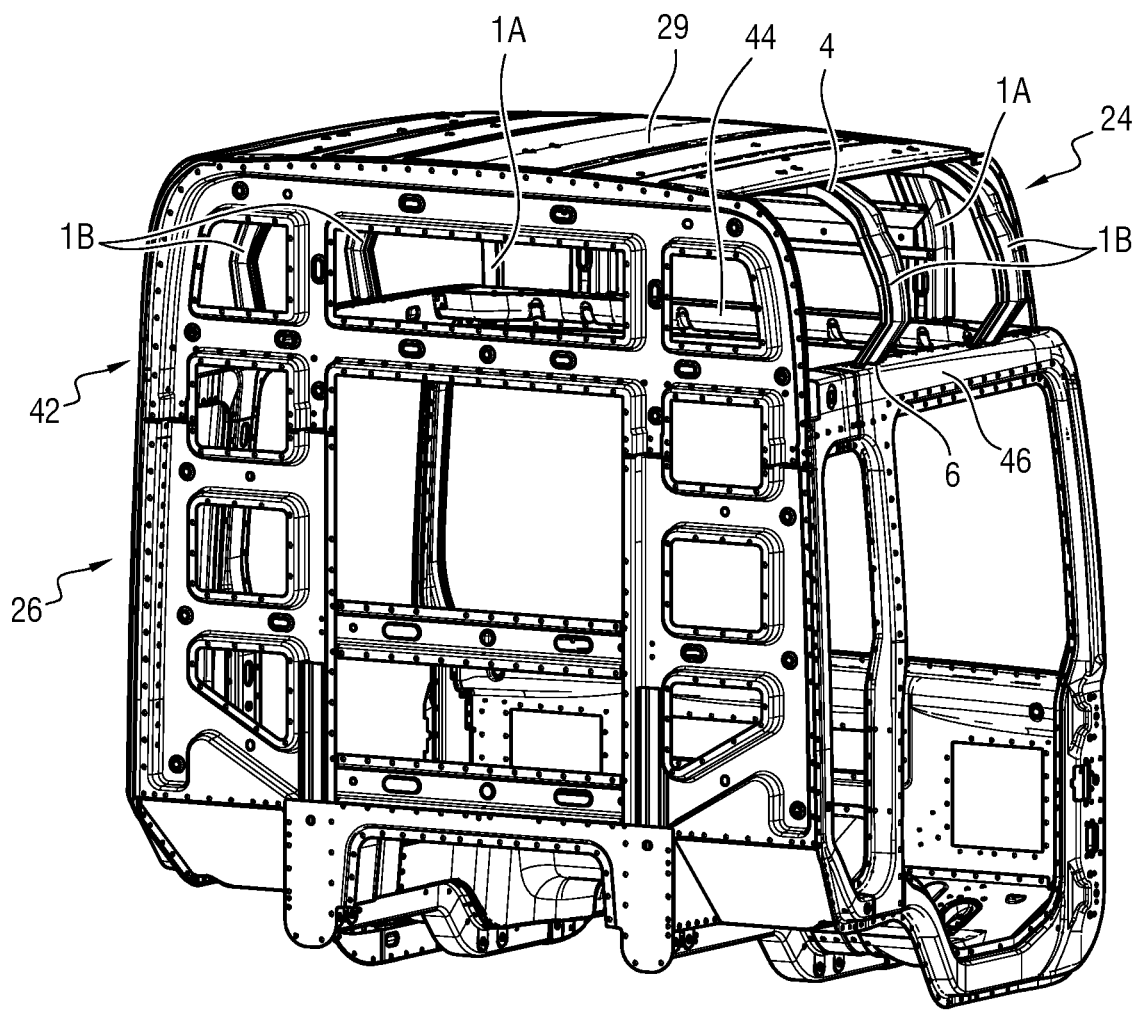
FIG. 5 is a perspective view of the heavy goods vehicle compartment of FIG. 4 after an impact against the roof of the vehicle compartment.

As mentioned previously, the reinforcement member 1 can be used in a roof reinforcement assembly 24 for a vehicle compartment of a heavy goods vehicle, as shown in FIGS. 3 to 5. Such a heavy goods vehicle, also known as a truck or a lorry, is a vehicle having a weight of 3.5 tons or more. The structure of such a heavy goods vehicle comprises a vehicle body, carrying the wheels and, for example, means for attaching a lorry trailer, and a vehicle compartment 26 attached to the vehicle body.

As shown in FIG. 4, the roof reinforcement assembly 24 forms the upper part of the vehicle compartment body and is intended to be covered with exterior panels forming the roof of the vehicle compartment. The vehicle compartment body is formed by an assembly of members forming "the skeleton" of the vehicle compartment.

The roof reinforcement assembly 24 comprises a roof reinforcement structure 28 formed by a plurality of members extending substantially along a roof plane, which is intended to be horizontal in normal use of the heavy goods vehicle. More particularly, according to the embodiments shown in FIGS. 3 to 5, the roof reinforcement structure 28 comprises, for example, two longitudinal members 30 and two transversal members 32.

The longitudinal members 30 are parallel to each other and extend substantially along a longitudinal direction corresponding to the rear-front direction of the vehicle. Each longitudinal member 30 extends between a front end 34 and a rear end 36.

The transversal members 32 are parallel to each other and extend substantially along a transversal direction substantially perpendicular to the longitudinal direction and corresponding to the left-right direction of the vehicle. Each transversal member extend between two lateral ends 38.

The longitudinal members 30 and the transversal members 32 define together a frame surrounding a rectangular space 40. The front ends 34, the rear ends 36 and the lateral ends 38 each extend at the exterior of the frame, i.e. outside the rectangular space 40. The roof reinforcement structure 28 has a U-shaped cross-section in a plane perpendicular to the roof plane, the U opening towards the exterior of the vehicle such that, when a roof panel 29 is arranged on the roof reinforcement structure 28, the U shape is closed by the roof panel 29.

The roof reinforcement structure 28 is for example made integral, meaning that the longitudinal members 30 and the transversal members 32 are made of a single part. Alternatively, the roof reinforcement structure 28 can be made of separate reinforcement members attached to each other for example by welding. The roof reinforcement structure 28 is for example made of a bake hardening steel having a tensile strength substantially comprised between 300 and 360 MPa.

At each front ends 34 and at each lateral ends 38, a reinforcement member 1 as described previously is attached to the roof reinforcement structure 28. The reinforcement member 1 is attached to the roof reinforcement structure 28 by its first end 4 by welding the first end 4 to the end of the roof reinforcement structure 28 such that the inner face 12 of the body 2 is turned towards the exterior of the vehicle. This means that the U-shape of the body 2 and the U-shape of the roof reinforcement structure 28 extend in the continuity of each other, as shown in FIG. 3.

The reinforcement elements 1 extend mainly along a direction forming a non-zero angle with the roof plane. More particularly, the reinforcement elements 1 are for example substantially perpendicular to the roof plane, meaning that the reinforcement elements 1 extend along a vertical direction in normal use of the vehicle. According to the embodiment shown in the figures, the reinforcement element is slightly curved, in particular in the vicinity of its first end 4, such that the first end 4 extends along the roof plane and the rest of the body 2 extends along the direction substantially perpendicular to the roof plane. According to this embodiment, the first end 4 is not provided with tabs 16 since the first end 4 extends along the same direction as the end of the roof reinforcement structure 28 to which the first end 4 is attached. In this case, the body 2 is directly attached to the roof reinforcement structure 28 by welding the U-shaped cross-section of the body to the U-shaped end of the roof reinforcement structure 28. Alternatively, the first end 4 of the reinforcement members 1 could be attached to the roof reinforcement structure 28 by tabs 16. In this case, the reinforcement members 1 could be straight members 1 extending along a single direction substantially perpendicular to the roof plane.

Since reinforcement members 1 are attached to each front ends 34 of the longitudinal members 30 and to each lateral ends 38 of the transversal members 32, the roof reinforcement assembly comprises two front reinforcement members 1A and four lateral reinforcement members 1B according to the embodiment shown in the figures.

The reinforcement elements 1A and 1B form feet supporting the roof reinforcement structure 28 and joining the roof reinforcement structure 28 to a compartment reinforcement structure 42 shown in FIGS. 4 to 5.

The compartment reinforcement structure 42 extends around the vehicle compartment substantially above the seats arranged in the vehicle compartment. The compartment reinforcement structure 42 comprises a front transversal member 44 substantially parallel to the transversal members 32 of the roof reinforcement structure 28 and extending above the windshield of the vehicle compartment. The compartment reinforcement structure 42 also comprises two lateral longitudinal members 46 substantially parallel to the longitudinal members 30 of the roof reinforcement structure 28 and extending above the doors of the vehicle compartment. The front ends of the lateral longitudinal members 46 are attached to the lateral ends of the front transversal member 44. The compartment reinforcement structure 42 therefore extends along a plane substantially parallel to the roof plane.

The front reinforcement members 1A are attached to the front transversal member 44, two of the lateral reinforcement members 1B are attached to one of the lateral longitudinal member 46 and the other two of the lateral reinforcement members 1B are attached to the other lateral longitudinal member 46. The reinforcement members 1 are attached to the compartment reinforcement structure 42 by their second ends 6 via the tabs 16 provided at the second ends 6 of the reinforcement members 1. The tabs 16 are welded to a wall of the corresponding member of the compartment reinforcement structure 42, said wall extending in the same direction as the tabs 16 and extending between the ends of the corresponding member of the compartment reinforcement structure 42.

According to an embodiment, the roof reinforcement assembly 24 further comprises a front member 48 extending between the two front reinforcement members 1A in a direction substantially parallel to the front transversal member 44. This front member for example serves as a support for an upper dashboard extending above the windshield in a vehicle compartment of a heavy goods vehicle.

The roof reinforcement assembly 24 described above forms a particularly robust assembly arranged to prevent a crushing of the roof in the vehicle compartment in case of an impact against the roof of the vehicle compartment, for example in case of a barrel roll of the vehicle.

In case of such an impact, the roof reinforcement assembly 24 and more particularly the reinforcement members 1 are first subjected to a load imparted in a direction substantially perpendicular to the direction in which the reinforcement members extend. This load is imparted when the vehicle compartment is first hit on the side when the vehicle compartment rolls over. Thanks to the high mechanical characteristics of the high strength steel of the reinforcement members 1, this transversal load does not cause a deformation of the roof reinforcement assembly 24 in the transversal direction and on the side against which the transversal load is applied, as would be the case with a conventional reinforcement structure. Consequently, when the vehicle compartment is upside down and an important load is applied in the direction of the reinforcement elements 1, the reinforcement assembly 24 is can fulfill its role of absorbing energy via the roof reinforcement structure 28 and of transmitting the energy through the reinforcement members 1 to the compartment reinforcement structure 42, which results in a controlled crushing of the roof reinforcement assembly 24 without risking hitting the driver and the passengers of the vehicle compartment, as shown in FIG. 5.

The reinforcement member and the associated roof reinforcement assembly are particularly suited to respond to the requirements of Test C (or Roof Strength Test) of the ECE (Economic Commission for Europe) regulation ECE-R29/03.

Figure 6:
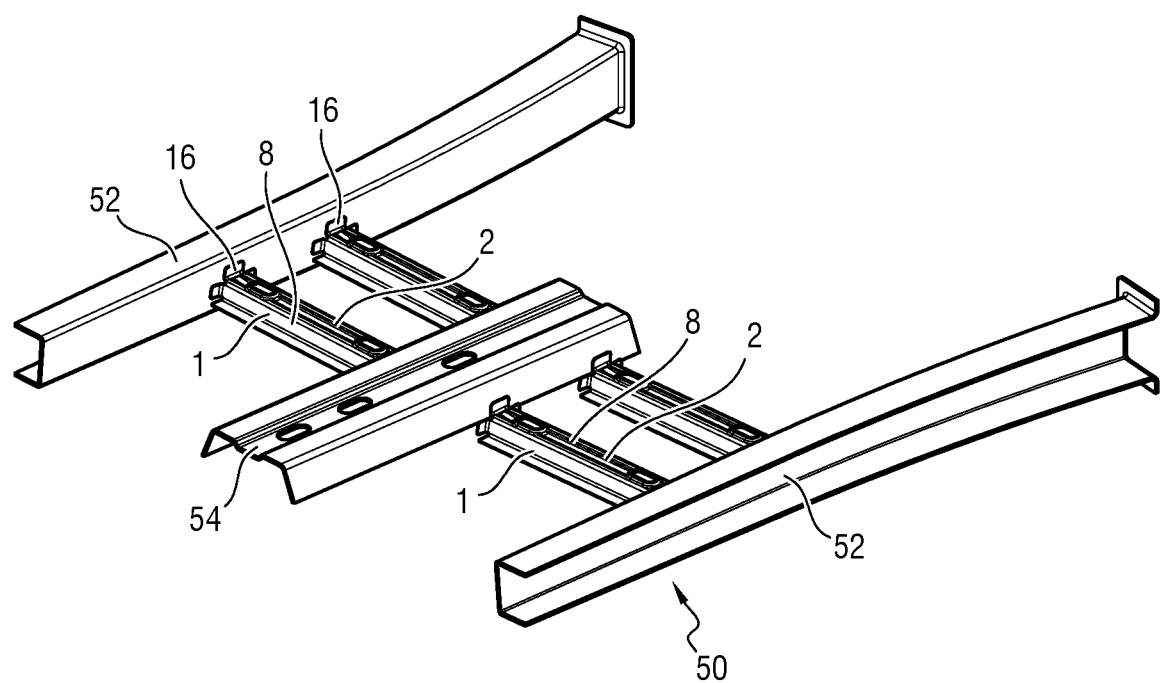
FIG. 6 is a perspective view of a seat crossmember assembly according to the invention.

As described previously, the reinforcement member 1 can also be used in a seat crossmember assembly as shown in FIG. 6. Such a seat crossmember assembly can be used in any kind of automotive vehicle. Such a seat crossmember assembly comprises a floor reinforcement structure 50 arranged to support the floor panels of the automotive vehicle. Such a floor reinforcement structure 50 for example comprises two side rails 52 extending substantially in a longitudinal direction and forming the lateral ends of the floor reinforcement structure. The floor reinforcement structure further comprises a central tunnel 54 extending in a longitudinal direction between the side rails 52. The central tunnel 54 is connected to each side rail 52 by at least one reinforcement element 1 as described above. Each reinforcement element 1 extends substantially transversely between one of the side rails 52 and the central tunnel 54 and is attached to the side rail 52 and/or to the central tunnel 54 by welding a tab 16 of the reinforcement element 1 to the side rail 52 and/or to the central tunnel 54. As shown in FIG. 6, the tabs 16 allow directly welding the reinforcement element 1 to the side rail 52 and/or to the central tunnel 54 without requiring any additional attachment part. The reinforcement elements 1 are used as seat crossmembers, meaning that a seat in the automotive vehicle is arranged above and attached to one reinforcement element in order to protect the seat in case of an impact against the floor reinforcement structure by forming an undeformable part under the seating area of the seat.

What is claimed is:

1. A reinforcement member for a vehicle comprising:
    a body made of a press hardened steel having a tensile strength greater or equal to 1200 MPa coated with a zinc-based coating or with an aluminum-based coating, said body extending along a main direction,
    at least one tab extending from the body along a transversal direction forming a non-zero angle with the main direction, and
    a bend between the body and the tab defining an intrados and an extrados, wherein
    said at least one tab is made of a cold bent part of the body, and
    an elongation of the extrados is between 10% and 25%.

2. The reinforcement member of claim 1, wherein the non-zero angle is between 45° and 100°.

3. The reinforcement member of claim 1, wherein a curvature radius of the bend between the body and the tab is between 3 mm and 7 mm.

4. The reinforcement member of claim 1, wherein the press hardened steel comprises in % weight:
    $0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration; or 0.20%≤C≤0.25%, 1.1%≤Mn≤1.4%, 0.15%≤Si≤0.35%, Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration; or 0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration.

5. The reinforcement member of claim 1, wherein the body has substantially a U-shaped cross-section and comprises an inner face extending on an interior of the U-shaped cross-section and an outer face extending on an exterior of the U-shaped cross-section, the intrados extending on the outer face and the extrados extending on the inner face.

6. The reinforcement member of claim 1, wherein the body has substantially a U-shaped cross-section and comprises an inner face extending on an interior of the U-shaped cross-section and an outer face extending on an exterior of the U-shaped cross-section, the intrados extending on the inner face and the extrados extending on the outer face.

7. A roof reinforcement assembly for a heavy goods vehicle, comprising a roof reinforcement structure for receiving a roof panel of the heavy goods vehicle, said roof reinforcement structure extending substantially along a roof plane, and a compartment reinforcement structure substantially parallel to the roof reinforcement structure, wherein the roof reinforcement structure is connected to the compartment reinforcement structure by at least one reinforcement member according to claim 1, said reinforcement member extending from the roof reinforcement structure to the compartment reinforcement structure along a direction forming a non-zero angle with the roof plane.

8. The roof reinforcement assembly of claim 7, wherein the reinforcement member extends substantially perpendicularly to the roof plane.

9. The roof reinforcement assembly of claim 7, wherein the tab of the reinforcement member is welded to the compartment reinforcement structure.

10. The roof reinforcement assembly of claim 7, comprising a plurality of reinforcement members connecting the roof reinforcement structure to the compartment reinforcement structure.

11. The roof reinforcement assembly according of claim 10, wherein the roof reinforcement structure comprises two longitudinal members parallel to each other and extending substantially along a longitudinal direction between a front end and a rear end and two transversal members parallel to each other and substantially perpendicular to the longitudinal members between two lateral ends, the roof reinforcement assembly comprising two front reinforcement members extending from the front ends of the longitudinal members and four lateral reinforcement members extending from the lateral ends of the transversal members.

12. The roof reinforcement assembly of claim 11, further comprising a front member extending between and attached to the front reinforcement members.

13. The roof reinforcement assembly of claim 11, wherein the compartment reinforcing structure comprises a front transversal member substantially parallel to the transversal members of the roof reinforcement structure, and two lateral longitudinal members substantially parallel to the longitudinal members of the roof reinforcement structure, the front reinforcement members being attached to the front transversal member, two of the lateral reinforcement members being attached to one of the lateral longitudinal member and the other two of the lateral reinforcement members being attached to the other lateral longitudinal member.

14. A seat crossmember assembly for an automotive vehicle, comprising at least one floor reinforcement structure arranged for receiving at least one seat of the automotive vehicle, wherein the seat is attached to the floor reinforcement structure via at least one reinforcement member according to claim 1, said reinforcement member being attached to said floor reinforcement structure.

15. The seat crossmember assembly of claim 14, wherein the floor reinforcement structure comprises at least one side rail extending along a longitudinal direction and at least one central tunnel substantially parallel to the side rail, the reinforcement member extending along a transversal direction between the side rail and the central tunnel and being attached to said side rails and/or to said central tunnel by at least one tab of the reinforcement member.

16. The seat crossmember assembly of claim 15, wherein the floor reinforcement structure comprises two side rails extending on either side of the central rail, the central rail being connected to one of the side rails by at least one reinforcement member and to the other side rail by at least one another reinforcement member.

17. A method for producing a reinforcement member according to claim 1, comprising the steps of:
providing a blank pre-coated with a zinc-based pre-coating or with an aluminum-based pre-coating,
hot press forming the blank into the shape of the body to obtain a body made of a press hardened steel having a tensile strength greater or equal to 1200 MPa,
bending a tab from the body when the body is cooled down such that the elongation of the extrados of the bend between the body and the tab is substantially comprised between 10% and 25%.

18. A method according to claim 17, wherein the hot press forming step occurs at a temperature between 750° C. and 950° C. and wherein the cold bending step occurs at a temperature between 10° C. and 40° C.

19. A method for producing a roof reinforcement assembly according to claim 7, comprising the steps of:
providing a roof reinforcement structure and a compartment reinforcement structure,
attaching the roof reinforcement structure to the compartment reinforcement structure by at least one reinforcement member by welding at least one tab of the reinforcement member to the roof reinforcement structure and/or to the compartment reinforcement structure.

20. A method for producing a seat crossmember assembly according to claim 14, comprising the steps of:
providing a floor reinforcement structure,
attaching at least one reinforcement member to the floor reinforcement structure by welding at least one tab of the reinforcement member to said floor reinforcement structure.

21. The reinforcement member of claim 2, wherein the non-zero angle is between 85° and 95°.

* * * * *